(12) United States Patent
Seisdedos Santos

(10) Patent No.: US 11,506,072 B2
(45) Date of Patent: Nov. 22, 2022

(54) BLADE ASSEMBLY FOR GAS TURBINE ENGINE

(71) Applicant: ITP NEXT GENERATION TURBINES S.L., Vizcaya (ES)

(72) Inventor: Manuel Seisdedos Santos, Madrid (ES)

(73) Assignee: ITP NEXT GENERATION TURBINES S.L., Vizcaya (ES)

( * ) Notice: Subject to any disclaimer, the term of this patent is extended or adjusted under 35 U.S.C. 154(b) by 38 days.

(21) Appl. No.: 17/172,167

(22) Filed: Feb. 10, 2021

(65) Prior Publication Data

US 2021/0277790 A1 Sep. 9, 2021

(30) Foreign Application Priority Data

Mar. 3, 2020 (ES) ............................. ES202030183
Apr. 21, 2020 (GB) .................................. 2005789

(51) Int. Cl.
  *F01D 11/00* (2006.01)
  *F01D 5/30* (2006.01)
  *F01D 5/08* (2006.01)

(52) U.S. Cl.
  CPC .......... *F01D 11/006* (2013.01); *F01D 5/3015* (2013.01); *F01D 5/081* (2013.01);
  (Continued)

(58) Field of Classification Search
  CPC ...... F01D 11/006; F01D 11/001; F01D 11/00; F01D 5/3015; F01D 5/085; F01D 5/08;
  (Continued)

(56) References Cited

U.S. PATENT DOCUMENTS

| 6,290,464 B1 | 9/2001 | Negulescu et al. |
| 2016/0169024 A1* | 6/2016 | Beaujard ............... F01D 5/3015 |
| | | 416/193 A |
| 2017/0022836 A1 | 1/2017 | Negulescu et al. |

FOREIGN PATENT DOCUMENTS

| DE | 199 31 763 A1 | 1/2001 |
| EP | 1 004 748 A2 | 5/2000 |

(Continued)

OTHER PUBLICATIONS

Jul. 13, 2021 Extended European Search Report issued in European Patent Application No. 21155662.6.

(Continued)

*Primary Examiner* — Courtney D Heinle
*Assistant Examiner* — Ryan C Clark
(74) *Attorney, Agent, or Firm* — Oliff PLC

(57) ABSTRACT

A blade assembly for a gas turbine engine includes a rotor, a stator, a seal plate, and a sealing member. The rotor includes a rotor blade and a rotor disc. The rotor disc defines a bucket groove which receives a cooling fluid from a first cavity upstream of the rotor. The sealing member includes a control arm. The sealing member and the rotor define a flow cavity therebetween in fluid communication with an aperture of the seal plate. The flow cavity receives the cooling fluid flowing through the bucket groove and the aperture. The control arm and the seal plate define a gap therebetween fluidly communicating the flow cavity with a second cavity between the stator and the rotor. The control arm deflects at least a portion of the cooling fluid entering the flow cavity.

17 Claims, 7 Drawing Sheets

(52) U.S. Cl.
CPC .... *F05D 2220/323* (2013.01); *F05D 2230/60* (2013.01); *F05D 2240/24* (2013.01); *F05D 2240/55* (2013.01); *F05D 2240/80* (2013.01); *F05D 2250/71* (2013.01); *F05D 2260/20* (2013.01)

(58) Field of Classification Search
CPC .......... F05D 2220/323; F05D 2230/60; F05D 2240/24; F05D 2240/55; F05D 2250/71; F05D 2260/20
See application file for complete search history.

(56) References Cited

FOREIGN PATENT DOCUMENTS

| | | | | |
|---|---|---|---|---|
| EP | 1004748 A2 | * | 5/2000 | ............... F01D 1/32 |
| EP | 2 060 741 A2 | | 5/2009 | |
| EP | 2060741 A2 | * | 5/2009 | ............ F01D 11/001 |
| EP | 2 924 237 A1 | | 9/2015 | |
| EP | 1 780 380 B1 | | 11/2017 | |
| EP | 3 401 503 A1 | | 11/2018 | |
| EP | 3 670 834 A1 | | 6/2020 | |
| FR | 3020408 A1 | * | 10/2015 | ............ F01D 11/003 |
| FR | 3062414 A1 | * | 8/2018 | ............... F01D 5/08 |
| GB | 2413598 A | * | 11/2005 | ............ F01D 5/081 |

OTHER PUBLICATIONS

Aug. 25, 2020 Search Report issued in British Patent Application No. 2005789.9.

\* cited by examiner

BLADE ASSEMBLY FOR GAS TURBINE ENGINE

CROSS-REFERENCE TO RELATED APPLICATIONS

This specification is based upon and claims the benefit of priority from Spanish patent application number ES P202030183 filed on Mar. 3, 2020 and United Kingdom patent application number GB 2005789.9 filed on Apr. 21, 2020, the entire contents of which are incorporated herein by reference.

BACKGROUND

Field of the Disclosure

The present disclosure relates to a blade assembly and in particular a blade assembly for a gas turbine engine.

Description of the Related Art

Turbines of gas turbine engines generally operate at very high temperatures. Therefore, it is critical to ensure that components are adequately cooled. The turbines include complex cooling arrangements to ensure that the components are adequately cooled, but this requires parasitic cooling air that compromises engine efficiency. It is therefore desirable to use cooling air in an efficient manner.

Stator well cavities are generally cooled by cooling air introduced through discrete cooling holes. Existing cooling methods generally result in non-homogenous mixing of the cooling air with ingested gas derived from a main flow of the gas turbine engine. Such non-homogenous mixing in stator well cavities result in undesirable temperature gradients and high temperatures of the components. Further, existing methods may also result in undesirable temperature gradients between two cavities fore and aft of a stator seal.

SUMMARY

According to a first aspect there is provided a blade assembly for a gas turbine engine. The blade assembly includes a rotor, a stator, a seal plate, and a sealing member. The rotor includes a rotor blade and a rotor disc defining a bucket groove at least partially receiving the rotor blade therein. The bucket groove receives a cooling fluid from a first cavity upstream of the rotor. The stator is disposed downstream of the rotor. The stator and the rotor define a second cavity therebetween downstream of the first cavity. The seal plate is coupled to the rotor and facing the first cavity. The seal plate defines an aperture therethrough in fluid communication with the bucket groove. The sealing member includes a control arm extending at least radially towards the rotor. The sealing member and the rotor define a flow cavity therebetween in fluid communication with the aperture of the seal plate. The control arm and the seal plate define a gap therebetween fluidly communicating the flow cavity with the second cavity. The flow cavity receives the cooling fluid flowing through the bucket groove of the rotor disc and the aperture of the seal plate. The control arm deflects at least a portion of the cooling fluid entering the flow cavity. The gap allows at least a portion of the cooling fluid to exit the flow cavity and enter the second cavity.

In some embodiments, the control arm is inclined obliquely relative to a principal rotational axis of the rotor.

In some embodiments, the sealing member further includes a main portion extending from the rotor disc. The control arm extends from the main portion.

In some embodiments, the main portion is inclined obliquely relative to the principal rotational axis of the rotor.

In some embodiments, the main portion is generally parallel to the principal rotational axis of the rotor.

In some embodiments, an angle between the main portion of the sealing member and the principal rotational axis of the rotor is from about −60 degrees to about 60 degrees.

In some embodiments, the control arm further includes a tip distal to the main portion of the sealing member. In some embodiments, the gap is defined between the tip of the control arm and the seal plate.

In some embodiments, the control arm extends radially outwardly and axially from the main portion towards the seal plate relative to the principal rotational axis of the rotor.

In some embodiments, the rotor further includes a blade platform disposed radially outward of the bucket groove. In some embodiments, the seal plate radially extends from the rotor disc to the blade platform.

In some embodiments, the control arm extends at least radially towards the blade platform.

In some embodiments, the seal plate is coupled to the blade platform and the rotor disc.

In some embodiments, the stator further includes a stator seal.

In some embodiments, the sealing member further includes one or more fins extending towards and cooperating with the stator seal.

In some embodiments, the sealing member is integral with the rotor disc.

In some embodiments, the rotor further includes a drive arm extending from the rotor disc. The sealing member is separate from the drive arm.

According to a second aspect, there is provided a turbine for a gas turbine engine, the turbine including the blade assembly of the first aspect.

According to a third aspect, there is provided a gas turbine engine for an aircraft, the gas turbine engine including the turbine of the second aspect.

The control arm may avoid a circumferential temperature gradient across the stator well cavities (i.e., the second cavity). Further, the control arm may ensure that surfaces of the rotor disc, the seal plate, and rotor blade are always wetted by the cooling fluid. The control arm may allow mixing of the cooling fluid and the core airflow at a comparatively higher radial position, depending on a length of the control arm and a width of the gap between the seal plate and the control arm. This may result in reducing the temperature of the second cavity. Further, high temperature gradients between two cavities fore and aft the stator seal may also be avoided. Such high temperature gradients may otherwise adversely impact the performance of the stator seal.

The control arm may allow homogenous mixing between the cooling fluid and an ingested flow from a core airflow of the gas turbine engine. Improving the mixing between the cooling fluid and the ingested flow may lower the temperatures of the various parts of the rotor. This can reduce the amount of cooling fluid required to meet the suitable temperatures. In other words, lower temperatures may be obtained for the same amount of cooling fluid flow. Therefore, this can improve the specific fuel consumption (SFC) of the gas turbine engine and/or allow use of lower cost materials.

Except where mutually exclusive, any of the features may be employed separately or in combination with any other features and the disclosure extends to and includes all combinations and sub-combinations of one or more features described herein.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring.

Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

As used herein, a component extends "axially" relative to an axis if the component extends along the axis. A component extends "circumferentially" relative to an axis if the component extends in a circumferential direction defined around the axis. A component extends "radially" relative to an axis if the component extends radially inward or outward relative to the axis. If a first component is disposed "radially outward" of a second component, the first component is disposed at a greater radial distance from an axis as compared to the second component. If a first component is disposed "radially inward" of a second component, a first component is disposed at a less radial distance from an axis as compared to a second component.

Figure 1:
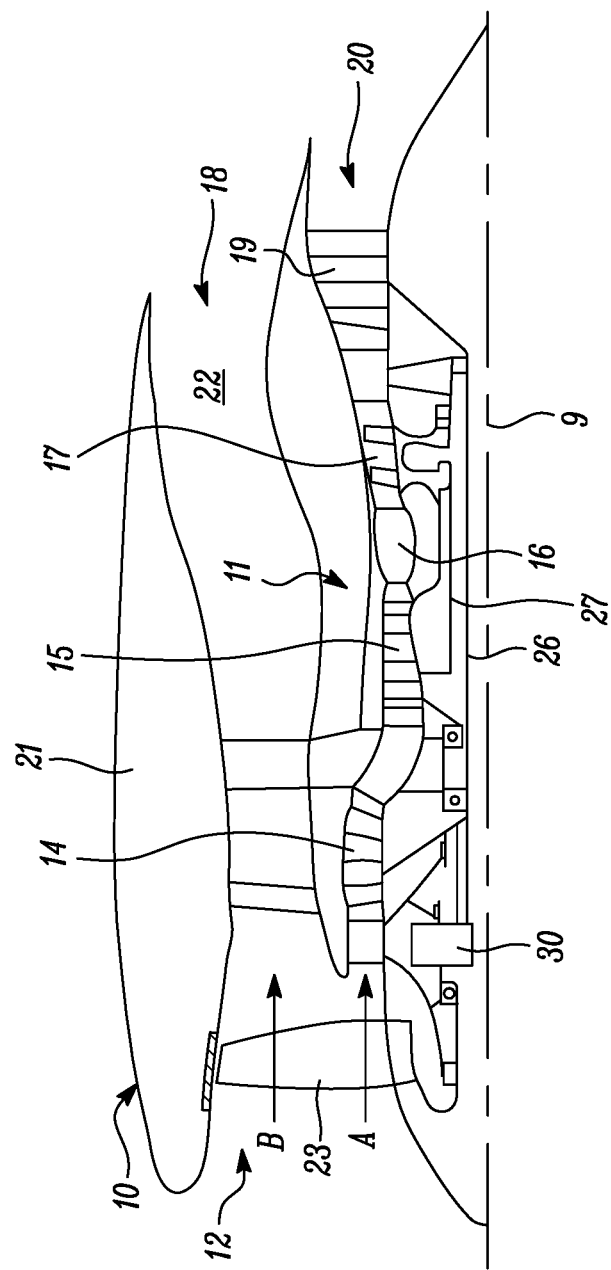
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
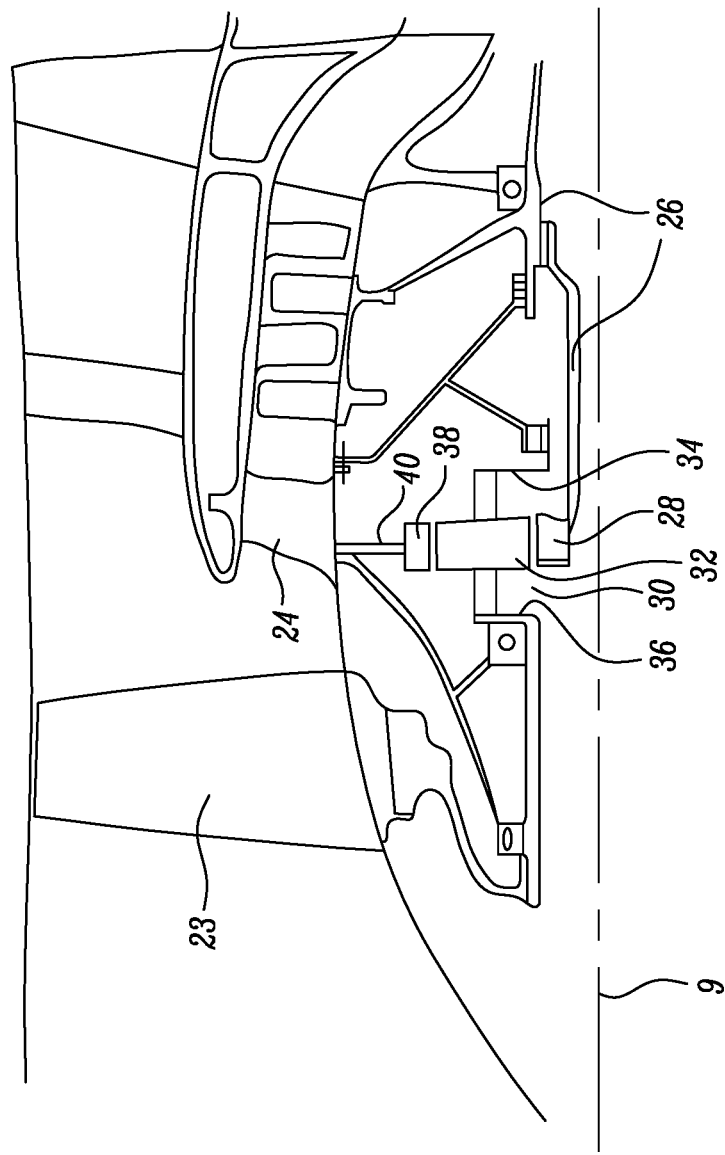
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
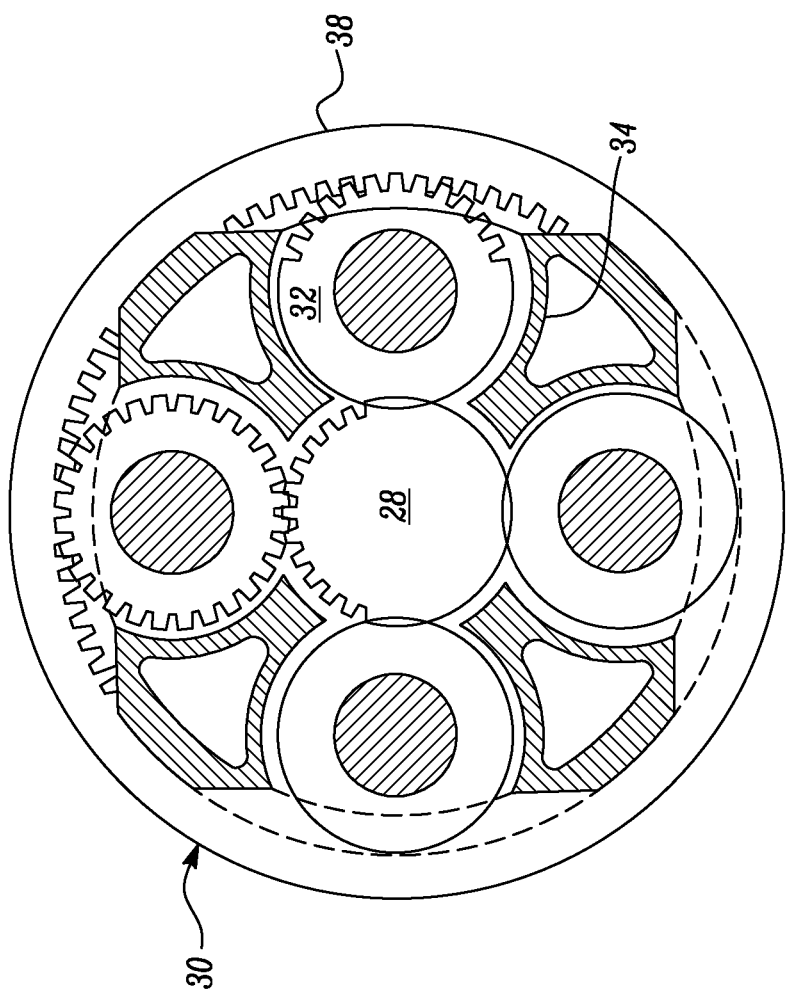
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Each of the high pressure turbine 17 and the low pressure turbine 19 of the gas turbine engine 10 (shown in FIG. 1) may include one or more rows of stators (not shown in FIG. 1) alternating with one or more rows of rotors (not shown in FIG. 1). A stator and a rotor immediately downstream of the stator may form a stage. The stator may include an annular array of radially extending stator vanes. The rotor may include an annular array of radially extending rotor blades mounted to a rotor disc. The combustion gases impinge on the stator vanes which present the gases at an appropriate angle to efficiently drive the rotor blades. The one or more rows of stators and one or more rows of rotors may form a blade assembly for the gas turbine engine 10.

Figure 4A:
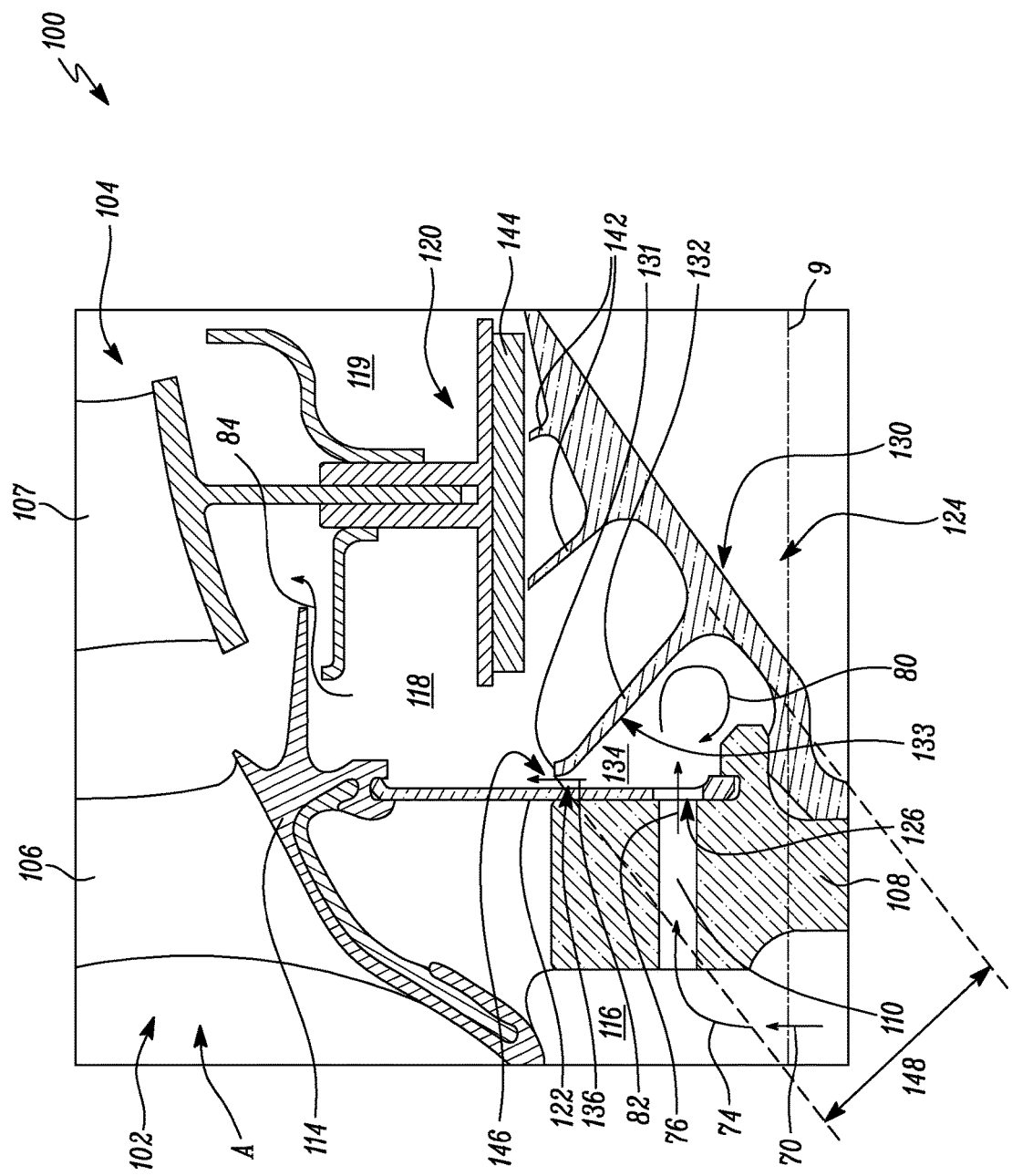
FIG. 4A is a schematic sectional side view of a part of a blade assembly for a gas turbine engine.
Figure 4B:
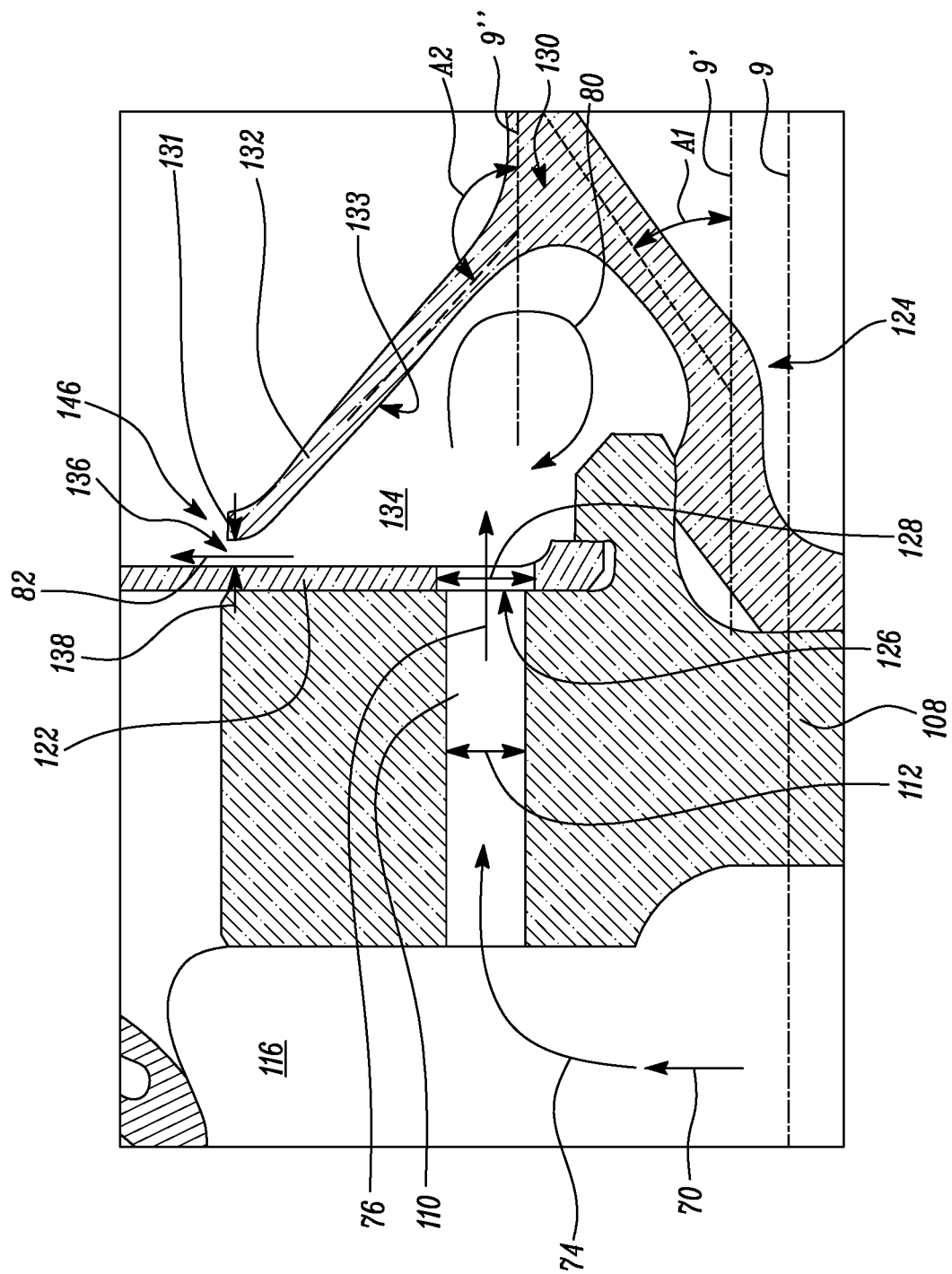
FIG. 4B is an enlarged sectional side view of the blade assembly of FIG. 4A.

FIGS. 4A and 4B illustrate a sectional side view and an enlarged view, respectively, of a blade assembly 100 for the gas turbine engine 10 (shown in FIG. 1).

Referring to FIGS. 1, 4A and 4B, the blade assembly 100 includes a rotor 102 and a stator 104. The rotor 102 includes a rotor blade 106 and a rotor disc 108. The rotor blade 106 and the rotor disc 108 may be joined together. The rotor disc 108 defines a bucket groove 110 that at least partially receives the rotor blade 106 therein. The bucket groove 110 may further define a space or a duct between the rotor blade 106 and the rotor disc 108. In some cases, the bucket groove 110 may be a dovetail groove. The rotor blade 106 and the rotor disc 108 may form a dovetail joint. The bucket groove 110 has a width 112. The width 112 is defined below the rotor blade 106. The width 112 may be defined by a clearance between the rotor blade 106 and the bucket groove 110. The rotor 102 may have an annular array of such rotor blades 106 supported on the rotor disc 108 via the bucket groove 110.

The rotor 102 further includes a blade platform 114 disposed radially outward of the bucket groove 110. The bucket groove 110 receives a cooling fluid 70 from a first cavity 116 upstream of the rotor 102, as indicated by arrow 74. The cooling fluid 70 may be cooling air bled from a flow from a compressor (e.g., the low pressure compressor 14) of the gas turbine engine 10.

The stator 104 is disposed downstream of the rotor 102. The stator 104 includes a stator vane 107. The rotor 102 and the stator 104 define a second cavity 118 therebetween downstream of the first cavity 116. The stator 104 further includes a stator seal 120. The stator seal 120 seals the second cavity 118 from a third cavity 119. Rotating and static parts of the blade assembly 100 form the stator seals 120 therebetween. In some cases, the stator seal 120 may include a labyrinth seal. The stator seal 120 may aim to minimise the performance penalties from the cooling fluid 70 leaking across the stator 104, and across the cavities 116, 118, and 119. In some cases, the stator seal 120 may form an interstage seal between two adjacent stages of the gas turbine engine 10.

The blade assembly 100 further includes a seal plate 122 and a sealing member 124. In the illustrated embodiment, the seal plate 122 is coupled to the rotor 102 and faces the first cavity 116. In some embodiments, the seal plate 122 is also coupled to the blade platform 114 and the rotor disc 108. Further, the seal plate 122 radially extends from the rotor disc 108 to the blade platform 114. The seal plate 122 may have a substantially annular and planar structure with curved portions at both radial ends. The curved portions may be received in corresponding grooves of the blade platform 114 and the rotor disc 108 in order to attach the seal plate 122 to the blade platform 114 and the rotor disc 108.

The seal plate 122 defines an aperture 126 therethrough in fluid communication with the bucket groove 110. The aperture 126 may be one of an array of circumferentially spaced apart apertures defined through the seal plate 122. The aperture 126 may have any suitable shape, for example, circular, elliptical, oval, polygonal, and so forth. The aperture 126 has a width 128. In the illustrated embodiment, the width 128 of the aperture 126 of the seal plate 122 is greater than or equal to the width 112 of the bucket groove 110 of the rotor disc 108. However, in some other cases, the width 128 of the aperture 126 of the seal plate 122 may be less than or equal to the width 112 of the bucket groove 110 of the rotor disc 108.

In some embodiments, the number of apertures 126 may be different from the number of rotor blades 106. In other words, one aperture 126 may be provided for multiple rotor blades 106. For example, one aperture 126 may be provided for a set of three adjacent rotor blades 106. In some embodiments, the number of the aperture 126 may depend on the required amount of the cooling fluid 70, manufacturing considerations and minimum allowable area available in the blade assembly 100.

In the illustrated embodiment, the sealing member 124 extends from the rotor disc 108. In some embodiments, the sealing member 124 may be integral with the rotor disc 108. In some other embodiments, the sealing member 124 may be formed independently from the rotor disc 108 and then connected to the rotor disc 108. The sealing member 124 includes a main portion 130 extending from the rotor disc 108. The main portion 130 is inclined obliquely relative to the principal rotational axis 9 (or parallel line 9' shown in FIG. 4B) of the rotor 102 and subtends an angle A1 with the principal rotational axis 9. In the illustrated embodiment, the angle A1 is positive. However, in some other cases, the angle A1 can be zero or negative based on the direction of inclination of the main portion 130 of the sealing member 124. In some embodiments, the angle A1 between the main portion 130 of the sealing member 124 and the principal rotational axis 9 of the rotor 102 is from about −60 degrees to about 60 degrees. The main portion 130 therefore extends both axially and radially relative to the rotor disc 108. The angle A1 may depend upon a geometry of the gas turbine engine 10.

The sealing member 124 and the rotor 102 define a flow cavity 134 therebetween in fluid communication with the aperture 126 of the seal plate 122. The flow cavity 134 receives the cooling fluid 70 flowing through the bucket groove 110 of the rotor disc 108 and the aperture 126 of the seal plate 122, as indicated by arrow 76.

The sealing member 124 further includes a control arm 132 extending at least radially towards the rotor 102. The control arm 132 is a part of the sealing member 124 of the blade assembly 100. In some embodiments, the control arm 132 extends at least radially towards the blade platform 114. In other words, the control arm 132 may be required to extend as close to the blade platform 114 as possible. In some embodiments, the control arm 132 extends from the main portion 130. The control arm 132 may elongate to a radial position 146 as high as possible and if required, the control arm 132 may act as an axial retainer by being in contact with the rotor blade 106. The high radial position 146 of the control arm 132 may cause greater surface area of the rotor blade 106 contacting the cooling fluid 70, subsequently providing improved mixing of the cooling fluid 70 and results in better cooling of the flow cavity 134. The control arm 132 is inclined obliquely relative to the principal rotational axis 9 (or parallel line 9" shown in FIG. 4B) of the rotor 102 and subtends an angle A2 with the principal rotational axis 9. The control arm 132 therefore extends both radially and axially relative to the main portion 130 of the sealing member 124. The angle A2 may depend upon a geometry of the gas turbine engine 10.

The control arm 132 includes an angled surface 133 upon which the cooling fluid 70 impinges. The angled surface 133 may be arcuate. The angled surface 133 is also inclined at the angle A2 relative to the principal rotational axis 9. The impact of the cooing fluid on the angled surface 133 may cause the cooling fluid to spread out, particularly in the circumferential direction thereby equalizing the pressure distribution across the second cavity 118. The control arm 132 further includes a tip 131 distal to the main portion 130 of the sealing member 124.

The control arm 132 deflects at least a portion of the cooling fluid 70 entering the flow cavity 134. The deflected cooling fluid, indicated by arrow 80, may swirl around the flow cavity 134, thereby decreasing the temperature of the flow cavity 134 and then exit the flow cavity 134 to enter the second cavity 118.

In the illustrated embodiment, the control arm 132 extends radially outwardly and axially from the main portion 130 towards the seal plate 122 relative to the principal rotational axis 9 of the rotor 102. The control arm 132 and the seal plate 122 define a gap 136 therebetween fluidly communicating the flow cavity 134 with the second cavity 118. In some embodiments, the gap 136 is defined between the tip 131 of the control arm 132 and the seal plate 122. The gap 136 allows at least a portion of the cooling fluid 70 to exit the flow cavity 134 and enter the second cavity 118, as indicated by arrow 82. The gap 136 has a width 138. The width 138 is a distance between the seal plate 122 and the tip 131 of the control arm 132. The control arm 132 may have a convergent configuration such that the width 138 is as small as possible. In other words, the control arm 132 may converge at the high radial position 146. In the illustrated embodiment, the control arm 132 may be curved proximal to the tip 131 such that the tip 131 extends substantially parallel to the seal plate 122.

The cooling fluid 70 flows from the first cavity 116 through the bucket groove 110 of each rotor blade 106. The cooling fluid 70 is discharged into the flow cavity 134 through the aperture 126. In some cases, the cooling fluid 70 exits through multiple such apertures 126. Further, the cooling fluid 70 may exit homogeneously though the gap 136. The cooling fluid 70 may be further discharged to the second cavity 118 at the high radial position 146. The cooling fluid flow further exits the second cavity 118 through the gap 136, as indicated by arrow 84.

In some embodiments, the sealing member 124 further includes one or more fins 142 extending towards and cooperating with the stator seal 120. The fins 142 seal against a static seal part 144 of the stator seal 120. The stator seal 120 may create a resistance to cooling fluid flow by forcing the cooling fluid 70 to traverse through the fins 142. During operation, a relatively small amount of the cooling fluid 70 can pass through the sealing member 124 from the second cavity 118 to the third cavity 119 to provide cooling thereto.

The control arm 132 may avoid a circumferential temperature gradient across the stator well cavities (i.e., the second cavity 118). Further, the control arm 132 may ensure that surfaces of the rotor disc 108, the seal plate 122, and rotor blade 106 are always wetted by the cooling fluid 70. The control arm 132 may allow mixing of the cooling fluid 70 and the core airflow A at the high radial position 146, depending on a length 148 of the control arm 132 and the width 138 of the gap 136 (i.e., distance between the seal plate 122 and the tip 131 of the control arm 132). This may result in reducing the temperature of the second cavity 118. Further, high temperature gradients between the two cavities fore and aft the stator seal 120 (i.e., the second and third cavities 118, 119) may also be avoided. Such high temperature gradients may otherwise adversely impact the performance of the stator seal 120.

The control arm 132 may allow homogenous mixing between the cooling fluid 70 and an ingested flow from the core airflow A. Improving the mixing between the cooling fluid 70 and the ingested flow may lower the temperatures of the blade platform 114 and rear or downstream parts of the rotor blade 106 and the rotor disc 108. This can reduce the amount of cooling fluid 70 required to meet the suitable temperatures. In other words, lower temperatures may be obtained for the same amount of cooling fluid flow. Therefore, this can improve a specific fuel consumption (SFC) of the gas turbine engine 10 and/or allow use of lower cost materials. The control arm 132 may also reduce weight, manufacturing complexity and/or cost of the blade assembly 100. The estimated temperature reduction achieved by including the control arm 132 flow may be between 60 K and 100 K.

Figure 5A:
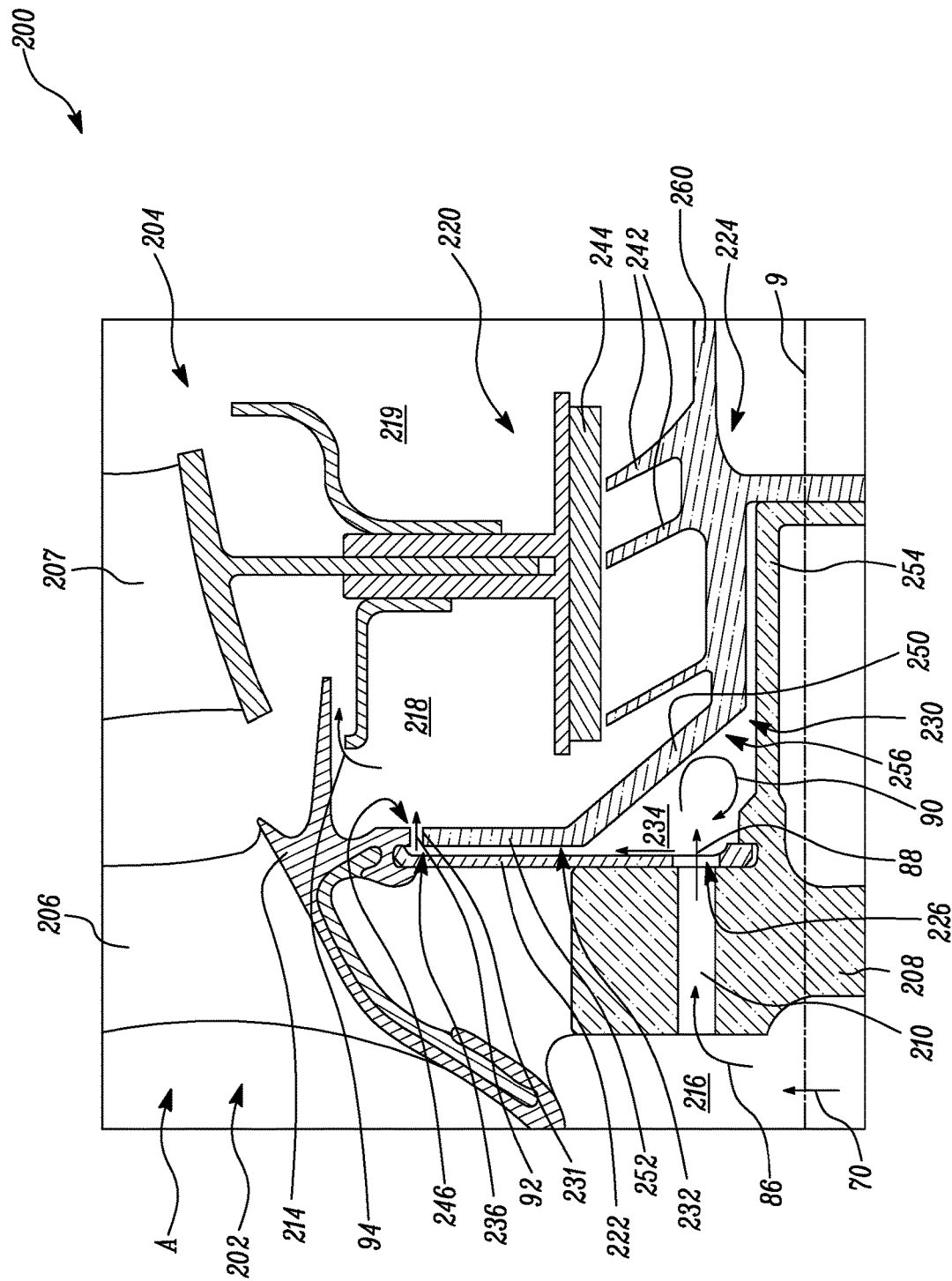
FIG. 5A is a schematic sectional side view of a part of another blade assembly for a gas turbine engine.
Figure 5B:
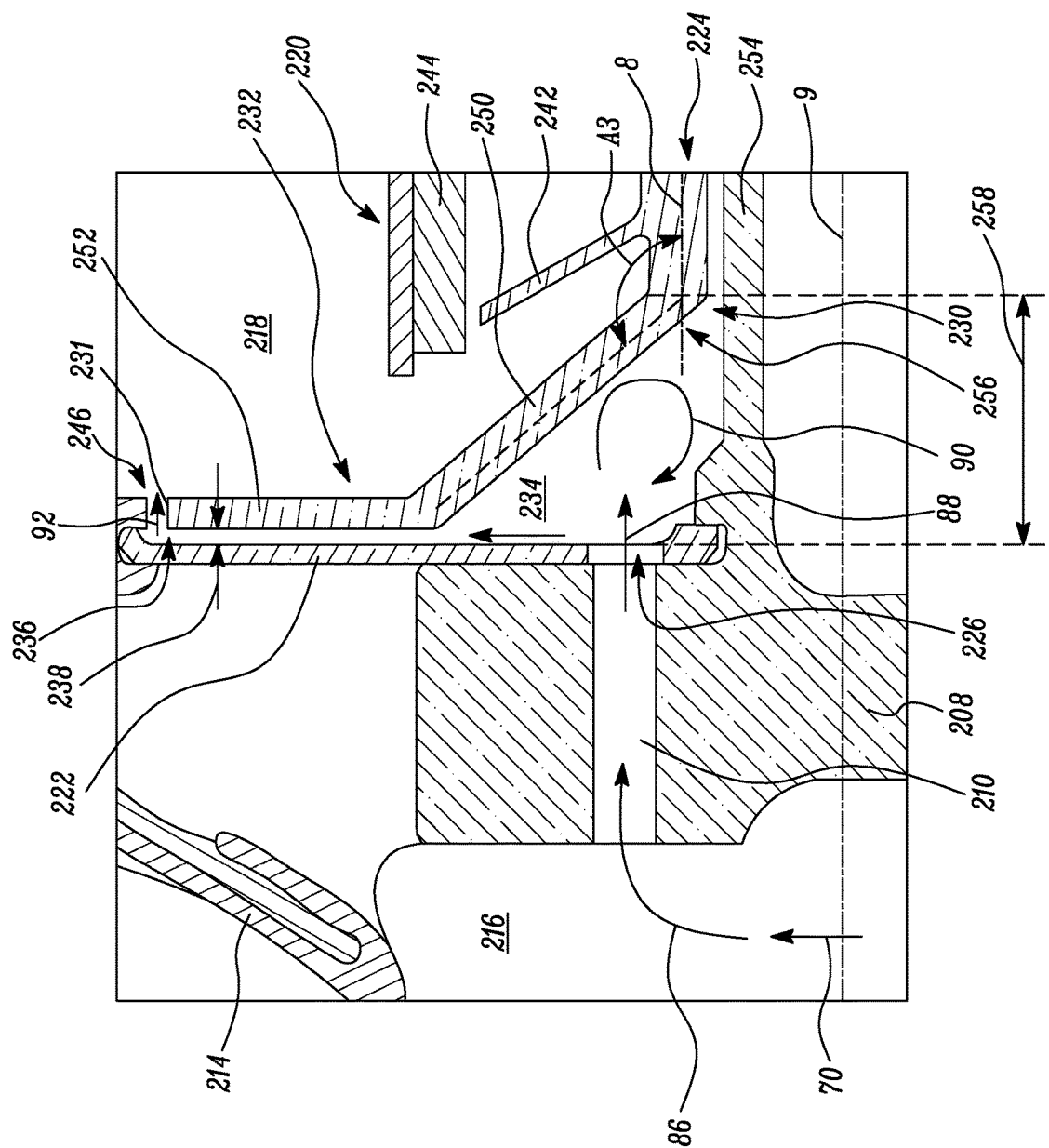
FIG. 5B is an enlarged sectional side view of the blade assembly of FIG. 5A.

FIG. 5A illustrates a sectional side view of a part of a blade assembly 200 for the gas turbine engine 10. FIG. 5B illustrates an enlarged view of the blade assembly 200. Referring to FIGS. 5A and 5B, the blade assembly 200 is similar to the blade assembly 100. The blade assembly 200 includes a rotor 202, a stator 204, a rotor blade 206, a stator vane 207, a rotor disc 208, a bucket groove 210, a blade platform 214, a first cavity 216, a second cavity 218, a third cavity 219, a stator seal 220, a seal plate 222, a sealing member 224, an aperture 226, a flow cavity 234, a gap 236, fins 242, and a static seal part 244 equivalent to the rotor 102, the stator 104, the rotor blade 106, the stator vane 107, the rotor disc 108, the bucket groove 110, the blade platform 114, the first cavity 116, the second cavity 118, the third cavity 119, the stator seal 120, the seal plate 122, the sealing member 124, the aperture 126, the flow cavity 134, the gap 136, the fins 142, and the static seal part 144, respectively, of the blade assembly 100.

The rotor 202 further includes a drive arm 254 extending from the rotor disc 208. The drive arm 254 may be annular. The drive arm 254 may engage another drive arm 260.

The drive arm 260 is a part of the sealing member 224. In the illustrated embodiment, the sealing member 224 is separate from the drive arm 254. However, in some other cases, the sealing member 224 may be integral with the drive arm 254. Further, the sealing member 224 includes a main portion 230. The main portion 230 is generally parallel to the principal rotational axis 9 of the rotor 202.

The blade assembly 200 further includes a control arm 232. The control arm 232 includes a tip 231 distal to the main portion 230 of the sealing member 224. The control arm 232 extends radially outwardly and axially from an end 256 of the main portion 230 towards the seal plate 222 relative to the principal rotational axis 9. A distance 258 between the end 256 of the main portion 230 and the seal plate 222 is greater than a width 238 of the gap 236 (i.e., distance between the tip 231 of the control arm 232 and the seal plate 222). In other words, the control arm 232 converges at a high radial position 246 near the tip 231 of the control arm 232. The gap 236 may be required to be as small as possible at the high radial position 246.

In the illustrated embodiment, the control arm 232 includes two portions, namely, a first portion 250 and a second portion 252. However, in some cases the control arm 232 may include more than two portions. In some embodiments, each of the first and second portions 250, 252 of control arm 232 may have a same shape and dimensions. In some other embodiments, each of the first portion 250 and the second portion 252 of the control arm 232 may have different shapes and dimensions. The first portion 250 of the control arm 232 is inclined obliquely relative to the principal rotational axis 9 (or parallel line 8 shown in FIG. 5B) and subtends an angle A3 with the principal rotational axis 9. In the illustrated embodiment, the angle A3 is positive. However, in some other cases, the angle A3 can be negative based on a direction of inclination of the control arm 232. In other words, the first portion 250 of the control arm 232 may be inclined in a downward direction relative to the principal rotational axis 9. The second portion 252 of the control arm 232 is substantially normal to the principal rotational axis 9 (or parallel line 8 shown in FIG. 5B). In other words, the second portion 252 of the control arm 232 is substantially parallel to the seal plate 222. However, in other cases, the first portion 250 and the second portion 252 of the control arm 232 may have different configurations as along as the control arm 232 converges at the high radial position 246. For example, the first portion 250 and the second portion 252 of the control arm 232 may be inclined at a same angle relative to the principal rotational axis 9. In some other examples, the control arm 232 may have a single straight portion inclined at an angle.

In some other examples, the control arm 232 may have a single curved portion converging at the high radial position 246.

The cooling fluid 70 is received within the bucket groove 210 from the first cavity 216, as indicated by arrow 86. Further, the cooling fluid 70 passes through the aperture 226 and enters the flow cavity 234, as indicated by arrow 88. The cooling fluid 70 swirls around the flow cavity 234, as indicated by arrow 90. The cooling fluid 70 may provide cooling to the rotor 202 within the flow cavity 234. The cooling fluid 70 passes through the gap 236 at the high radial position 246, exits the flow cavity 234 and enters the second cavity 218, as indicated by arrow 92. Further, the cooling fluid 70 escapes the second cavity 218 and get mixed with the core airflow A, as indicated by arrow 94. At least a relatively small portion of cooling fluid 70 passes through the fins 242 of the sealing member 224 from the second cavity 218 to the third cavity 219 to provide cooling thereto. The control arm 232 may allow a homogeneous mixing of the cooling fluid 70 with an ingested flow from the core air flow A.

It will be understood that the invention is not limited to the embodiments above-described and various modifications and improvements can be made without departing from the concepts described herein.

I claim:

1. A blade assembly for a gas turbine engine, the blade assembly comprising:
    a rotor including a rotor blade and a rotor disc defining a bucket groove at least partially receiving the rotor blade therein, the bucket groove being configured to receive a cooling fluid from a first cavity upstream of the rotor;
    a stator disposed downstream of the rotor, the stator and the rotor defining a second cavity therebetween, the second cavity being downstream of the first cavity;
    a seal plate coupled to the rotor and facing the first cavity, the seal plate defining an aperture therethrough, the aperture being in fluid communication with the bucket groove; and
    a sealing member including a control arm extending at least radially towards the rotor, the sealing member contacting the rotor to define a flow cavity therebetween, the flow cavity being in fluid communication with the aperture of the seal plate, the control arm and the seal plate defining a gap therebetween, the gap fluidly communicating the flow cavity with the second cavity, wherein:
        the flow cavity is configured to receive the cooling fluid flowing through the bucket groove of the rotor disc and the aperture of the seal plate,
        the control arm is configured to deflect at least a portion of the cooling fluid entering the flow cavity, and
        the gap is configured to allow at least a portion of the cooling fluid to exit the flow cavity and enter the second cavity.

2. The blade assembly of claim 1, wherein the control arm is inclined obliquely relative to a principal rotational axis of the rotor.

3. The blade assembly of claim 2, wherein:
    the sealing member further includes a main portion extending from the rotor disc, and
    the control arm extends from the main portion.

4. The blade assembly of claim 3, wherein the main portion is inclined obliquely relative to the principal rotational axis of the rotor.

5. The blade assembly of claim 3, wherein the main portion is parallel to the principal rotational axis of the rotor.

6. The blade assembly of claim 3, wherein an angle between the main portion of the sealing member and the principal rotational axis of the rotor is in a range of −60 degrees to 60 degrees.

7. The blade assembly of claim 3, wherein:
    the control arm further includes a tip distal to the main portion of the sealing member, and
    the gap is defined between the tip of the control arm and the seal plate.

8. The blade assembly of claim 3, wherein the control arm extends radially outwardly and axially from the main portion towards the seal plate relative to the principal rotational axis of the rotor.

9. The blade assembly of claim 1, wherein:
the rotor further includes a blade platform disposed radially outward of the bucket groove relative to a principal rotational axis of the rotor, and
the seal plate radially extends from the rotor disc to the blade platform relative to the principal rotational axis of the rotor.

10. The blade assembly of claim 9, wherein the control arm extends at least radially towards the blade platform relative to the principal rotational axis of the rotor.

11. The blade assembly of claim 9, wherein the seal plate is coupled to the blade platform and the rotor disc.

12. The blade assembly of claim 1, wherein the stator further includes a stator seal.

13. The blade assembly of claim 12, wherein the sealing member further includes one or more fins extending towards and cooperating with the stator seal.

14. The blade assembly of claim 1, wherein the sealing member is integral with the rotor disc.

15. The blade assembly of claim 1, wherein:
the rotor further includes a drive arm extending from the rotor disc, and
the sealing member is separate from the drive arm.

16. A turbine for a gas turbine engine, the turbine including the blade assembly of claim 1.

17. A gas turbine engine for an aircraft, the gas turbine engine including the turbine of claim 16.

* * * * *